United States Patent [19]

Butzow et al.

[11] Patent Number: 4,634,400
[45] Date of Patent: Jan. 6, 1987

[54] END STRESS RELIEF CONFIGURATION FOR FLEXIBLE ELEMENT OF ELASTOMERIC COUPLING

[75] Inventors: Neil W. Butzow, Greendale; Gerald G. Lambert, Brookfield; Donald Tumidajewicz, Windlake, all of Wis.

[73] Assignee: Rexnord Inc., Brookfield, Wis.

[21] Appl. No.: 149,599

[22] Filed: May 13, 1980

Related U.S. Application Data

[63] Continuation of Ser. No. 901,401, May 1, 1978, abandoned.

[51] Int. Cl.⁴ .............................. F16D 3/52; F16D 3/14
[52] U.S. Cl. ........................................ 464/88; 464/51; 464/85; 464/92; 464/93; 403/79; 428/156
[58] Field of Search ............... 64/11 R, 11 B, 27 NM, 64/11 F; 403/79; 428/156, 157, 192, 201; 464/51, 92, 82, 93, 85, 75, 88, 87, 89

[56] References Cited

U.S. PATENT DOCUMENTS

| | | |
|---|---|---|
| 1,937,581 | 12/1933 | Lord ........................................ 403/79 |
| 2,251,804 | 8/1941 | Reuter . |
| 2,636,360 | 4/1953 | Guy ........................................ 64/11 F |
| 2,752,766 | 7/1956 | Wildhaber ............................ 64/11 R |
| 2,760,359 | 8/1956 | Wildhaber ............................ 64/11 R |
| 2,867,103 | 1/1959 | Williams . |
| 2,896,431 | 7/1959 | Stillwagon . |
| 2,945,365 | 7/1960 | Ulderop . |
| 2,969,656 | 1/1961 | Reuter . |
| 3,034,321 | 5/1962 | Campbell . |
| 3,068,665 | 12/1962 | Firth .................................... 64/11 R |
| 3,099,879 | 8/1963 | Horovitz ............................. 64/11 R |
| 3,115,759 | 12/1963 | Crane . |
| 3,137,149 | 6/1964 | Schlotmann ........................ 64/11 R |
| 3,140,081 | 7/1964 | Peterson ............................. 64/11 R |
| 3,250,090 | 5/1966 | Thompson . |
| 3,404,544 | 10/1968 | Fawick . |
| 3,468,138 | 9/1969 | Downey .............................. 64/11 R |
| 3,524,332 | 8/1970 | Callies ................................ 64/11 R |
| 3,621,674 | 11/1971 | Olics . |
| 3,719,060 | 3/1973 | Fessel . |

*Primary Examiner*—Carl Stuart Miller
*Attorney, Agent, or Firm*—Richard C. Ruppin

[57] ABSTRACT

An improvement in shaft couplings having a flexible elastomeric center element positioned between and bonded to annular metal shoes, which increases the service life of the coupling by forming the elastomer to preferred shapes, contours and thicknesses adjacent a circumferential discontinuity of the shoes and center element.

16 Claims, 4 Drawing Figures

END STRESS RELIEF CONFIGURATION FOR FLEXIBLE ELEMENT OF ELASTOMERIC COUPLING

This is a continuation of application Ser. No. 901,401 filed on May 1, 1978 and now abandoned.

BACKGROUND OF THE INVENTION

1. Field of the Invention

This invention relates to flexible shaft couplings particularly to the type having an annularly discontinuous elastomeric portion joining a pair of shaft mounted hubs.

2. Description of the Prior Art

Flexible shaft couplings are used to physically and functionally connect the ends of two shafts positioned in end-to-end relation by bolting through holes formed in radially extending flanges and correspondingly aligned holes through the legs of angle shaped metal shoes, each located at the axial ends of the coupling. These shoes are formed to shape; placed in a heated mold into which is poured liquid, uncured elastomeric material; and bonded to the flexible material as the elastomer cures in the presence of heat. To facilitate assembly and disassembly, typically the couplings are formed in two annular halves. This construction requires the shoes and flexible center elements to be discontinuous around the circumference and, as is usually the case, each to terminate on a common radial plane.

A common, recurring problem in the use of couplings of this type is the tendency toward progressive and premature failure of the elastomer particularily near the bondline at the shoes. Flexible couplings, for the most part, function by transmitting primarily torque load from one shaft to another. Bending and axial loads are usually applied at low levels or are reduced to minimal magnitudes as a result of the flexible nature of the associate load paths through the coupling. The coupling offers, for example, very little resistance to bending about an axis normal to the shaft since the cross-section of the center element is extremely and intentionally inefficient in this respect. Static equilibrium requirements for structures consisting of a system of shafts to which bending loads are applied would necessitate that internal bending moments approach zero at the coupling since the bending stiffness of the coupling is so minimal as to stimulate a pinned connection between shafts in the flexural sense. Likewise, axial forces cannot rise to excessive magnitudes as a result of the slight axial displacement of one shaft with respect to another that usually occur, because the coupling, unlike the shafts it joins, is particularly flexible in the axial sense. Large axial motions would be required to develop substantial forces in this direction but are unlikely to occur in practical shaft systems. Where they do occur and flexible couplings are present, the elastic properties of the coupling accomodate sizable displacements longitudinally without correspondingly large internal axial forces being produced.

Torsion is transferred from the metal shoe at one coupling end to the opposite shoe through the center element principally by shearing radially through the elastomer. At the circumferential free edge of the center element where one coupling half abuts the mating second half, the internal shear stresses in the elastomer rise to a peak value that is greatly in excess of the average shear stress existing at points distant from the free edge. This local phenomenon has been particularly troublesome in applications of flexible couplings to systems where the torsion loads contain, in addition to, or perhaps instead of, a steadily applied torque component, cyclical, vibratory or shock components of torque. Occurrences of this sort are common in mechanical equipment. Starting and stopping conditions frequently produce shock or impulse loadings that are large in relation to the rated load of the coupling. In normal operation reciprocating equipment applies continual vibratory loads to the shafts that carry power to or from the equipment.

Cyclic and shock loading contribute to a spectrum of vibratory forces that combine to produce failure of the parts to which they are applied at load levels considerably below that which they could carry if the loads were static in nature. The observation of failures in this cyclic environment is well documented and is commonly referred to as fatigue.

Flexible couplings, then, are subject to local peaking shear stresses at the circumferential extremities of their mating halves and the load environment in which they operate is frequently fatigue-inducing. Designing couplings capable of satisfying service life requirements, particularly as regards premature fatigue shear stress failures, has been a troublesome problem of long standing.

SUMMARY OF THE INVENTION

The present invention is directed to flexible couplings for joining shaft ends in end-to-end relation and includes metal shoes at each coupling end joined together by being bonded to, or by being molded integrally with, a relatively flexible elastomeric center element that is positioned intermediate the shoes. The coupling is made in two semi-circular halves which abut one another at a diametral plane that produces an abrupt circumferential discontinuity and a free edge on the shoes and center element.

Shear stresses in the bondline tend to peak undesirably adjacent the free edge especially when the cross-section of the bonded parts is maintained uniformly throughout. In the present invention the cross-sectional area of the elastomer is gradually attenuated in the vicinity of the two free edges from its size throughout the rest of the coupling; hence the effect has been to significantly increase the fatigue life of the assembly when tested in a simulated load environment representing actual service conditions.

In a first configuration, the walls of the elastomeric center section have been tapered from the full thickness to half that value over a two inch length measured around the coupling circumference adjacent each free end. A second embodiment tapers the otherwise abrupt termination of elastomer at the ends with a linear transition section formed by a planar cut through the elastomer depth beginning at the free end and extending along the circumference to produce a sloping surface terminating at the point where the surface intersects the apex of the center section. A third approach has a semi-circular notch formed at the free end of the elastomer just above the bondline, which has, like the others, resulted in a fatigue life increase, presumably as a consequence of causing the peak shear stresses to be modified, redistributed and lessened.

DESCRIPTION OF THE PREFERRED EMBODIMENT

Figures 1, 2, 3, 4:
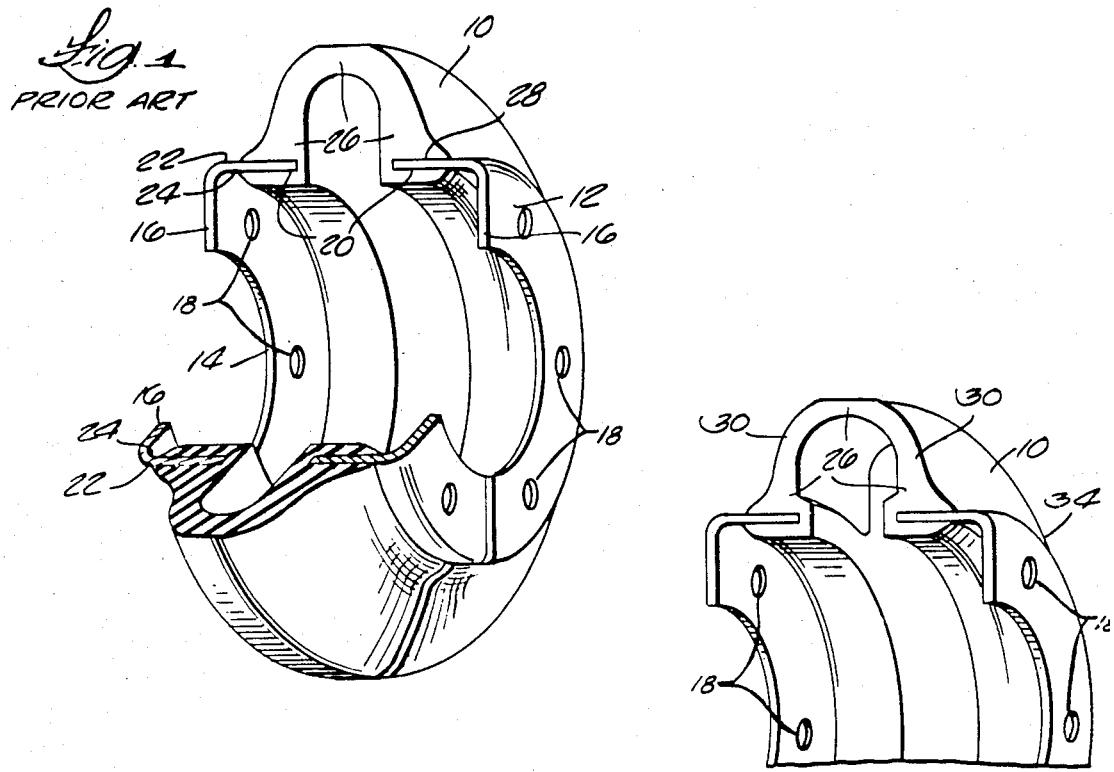
FIG. 1 is a partial section and end view of a flexible coupling from the prior art.
FIG. 2 is a partial end view of a first embodiment showing the wall thickness in transition from the full section to an end section thickness.
FIG. 3 is a partial end view of a second embodiment illustrating the cross-section of the center element in transition adjacent an end.
FIG. 4 is a partial end view of a third embodiment illustrating semi-circular notches adjacent an end.

In FIG. 1 there is shown one half of an angular flexible coupling assembly, known from the prior art, which consists of a semi-annular or sectorial center element 10 usually molded from an elastomer, preferably neoprene or polyurethane, that transmits the predominately torsional load between two metal shoes 12, 14 each having a semi-annular arcuate shape and two outstanding flanges.

Flanges 16 are radially directed and have holes 18 formed therethrough that are spaced around the annulus for engaging similarly arranged holes that connect a shaft end to the coupling. The second flanges 20 extend axially inwardly and form a surface to which is bonded the center element 10. In previously known assemblies the flanges 20 were either bonded to or molded with the center element 10 by a process that caused the flange to be imbedded in the elastomer and covered by it on both the outer surface 22 and inner surface 24. The coupling design provided for a constant cross-section of the element 10 to be maintained throughout the circumferential length, and, since the coupling is made in two diametrically opposite halves, to terminate both the shoes 12, 14 and the element 10 at a single planar end section 26.

Of principal concern in flexible couplings employing an elastomer-to-metal bond is the bond failure at the elastomer-metal interfaces 28. Shear stress within the elastomer tends to reach a maximum value close to the circumferential free end section 26 where the shoes and center element end, since at that point torque in the form of shear must be completely transferred to the metal shoe. Tension peel stress is present in the bond at this critical point, also, largely because of the disruptive effect which the discontinuity has upon the shear flow pattern in the elastomer.

The instant invention provides various means for gradually attenuating the cross-section of the element 10 adjacent the ends of each coupling half. Three distinctly different configurations produce the transition from the elastomer cross-section that is typical of the intermediate portions of the element 10. A first embodiment, shown in FIG. 2, provides for the thickness of the walls 30 to taper uniformly over an approximate length of from one to three inches from the thickness that is typical of the medial portions 34 of element 10 that are distant from edge 26 to about one-half that wall thickness at the free end 26. A thickness transition zone in which the wall thickness reduces from that of the inner portions of the center element 10 in steps to a reduced thickness at the end would be equally effective in realizing the desired result.

FIG. 3 illustrates a second embodiment in which the element 10 is made to reduce from its full radial cross-section at the medial portions 34 of element 10 that are distant from edge 26 by way of a uniformly tapering transition region produced by a planar surface 32 cut through the depth of the element 10 to produce a near feather edge at the outer edge of the surface 32 adjacent the end 26. The outer extremity of the surface 32 may be stepped 36 to terminate in a suitable thickness rather than a feather edge. The planar surface 32 has been found to produce the desired transition when it is inclined at an angle having a magnitude in the range of 30 to 45 degrees with a radius drawn from the shaft center to the end 26 as indicated by angle A in FIG. 3.

A third embodiment of the invention has relief notches 38, preferably of a semi-circular shape, formed just above the elastomer-to-metal interface 28 on end surface 26 through the wall thickness 30 of the element 10, as FIG. 4 illustrates. The notch should have a diameter approximately positioned within the radial plane that forms the free end 26 of element 10 and may extend entirely through the wall thicknesses 30 or be covered by a thin membrane 40, which is molded integrally with element 10 to seal the inner space of the coupling against the entrance of foreign, contaminating matter.

Although the invention has been described with respect to several preferred embodiments, it will be appreciated that various changes and modifications may be made therein without departing from the spirit and scope and thus they are not intended to limit the invention as recited in the following claims.

We claim:

1. In a coupling, for joining adjacent ends of two shafts that are approximately aligned on a central axis, of the type having a plurality of annular, sectorial members, each member including a flexible center element that includes two radially extending side walls having radially inner and outer portions, and an axially extending outer wall connecting the outer portions of said side walls, said walls forming a hollow cross-sectional shape having circumferential ends; each member also including two axially spaced annular, arcuate shoes having circumferential free terminal edges and providing surfaces onto which is bonded said inner portion of said side walls, wherein the improvement comprises: a portion of said side walls of each of said members circumferentially and radially adjacent the circumferential free terminal edges of said shoe having a cross-sectional area on a radial plane in which said axis lies that is substantially less than the cross-sectional area of said side walls at an angular position remote from and intermediate both of said circumferential ends, said wall cross-sectional area increasing gradually from said portion toward said intermediate position.

2. A coupling for transmitting torque between the adjacent ends of two shafts that are approximately aligned on a single axis, comprising:
  at least two flexible center elements in the form of sectors of an annulus, said elements each including a pair of axially spaced walls defining a hollow cross-sectional shape having circumferential ends;
  a pair of shoes for each element, each in the form of a sector of a ring and each having a surface onto which a respective one of said walls of said center element is bonded;
  said walls of said center element having circumferential ends, and a notch formed in each end defined by a substantially smooth and continuous periphery in the wall thickness and positioned radially outward from and adjacent the surface of said shoe to which the center element is bonded.

3. An elastomeric coupling for transmitting torque between two shafts approximately aligned on a shaft axis, comprising:

two semi-annular members, each having a pair of axially spaced semi-annular shoes bonded to a semi-annular flexible elastomeric center element;

said center element having an inwardly opening generally U-shaped cross-section on a radial plane lying along said shaft axis, said U-shaped cross-section having two radial legs having inner and outer portions and connected at their outer portions by an axial bridge portion;

each of said shoes having a cylindrical portion to which the inner portion of one of said radial legs is bonded, respectively, said cylindrical portion having a free circumferential edge;

said center element having two diametrically separated free circumferential faces adjacent the respective free circumferential edges of the shoes bonded to said center element, means in both of said faces defining a circumferentially opening semi-cylindrical recess adjacent to and radially outward of said free circumferential edge of said shoes, said recess having a recess axis lying parallel to said shaft axis.

4. An annular elastomeric torque transmission assembly made up of a plurality of angular sectors which are adapted to be operatively fastened together by attachment to a hub mounted in torque transmitting relationship on a shaft, each of said sectors comprising:

a metal shoe having means for torque transmitting connection to the hub;

said shoe having a radially facing surface, and terminating in two angularly spaced circumferential free edges;

an arcuate elastomeric member bonded to said radially facing surface of said shoe;

said elastomeric member having two angularly spaced circumferentially facing free surfaces;

the bond between said elastomeric member and said shoe having two axially extending circumferential terminal edges, each of which constitutes an angular discontinuity in said elastomer and creates a stress riser in the bond between said elastomeric member and said shoe;

a circumferentially opening relief in each of said circumferentially facing free surfaces of said elastomeric member adjacent the junction thereof with said shoe.

5. The coupling as defined in claim 1 wherein the side walls of the center element at the circumferential ends thereof are formed with a semi-cylindrical notch in the wall thickness, said notch being positioned slightly above the surface of said shoe and having a notch axis lying parallel to said central axis and approximately aligned with and perpendicular to a radius drawn from said central axis at said circumferential end.

6. The coupling as defined in claim 5 wherein said notch has a radially innermost periphery that is adjacent to the surface of the shoe to which the center element is bonded.

7. The coupling as defined in claim 6 wherein said notch extends axially substantially through the entire side wall thickness of the center element except for a thin membrane formed integrally with the axially outside surface of the center element side walls and covering the notch.

8. A coupling as defined in claim 2 wherein the innermost periphery of said notch is adjacent to and spaced slightly radially outward from the surface of the shoe to which the center element is bonded.

9. A coupling as defined in claim 8 wherein said notch is semi-circularly shaped and has an axis lying parallel with the axis of said flexible elements.

10. A coupling as defined in claim 8 or 9 wherein said notch extends substantially through the entire wall thickness of said center element except for a thin membrane formed integrally with said center element and lying on the axially outer surface of said center element.

11. The elastomeric coupling defined in claim 3, wherein said free circumferential faces of said center element extend angularly at least as far as said free circumferential edges of said shoes so that said free circumferential edges of said shoes extend angularly no further than said center element.

12. The elastomeric coupling defined in claim 11, wherein said recess is covered over on the axially facing surfaces of said radial legs by a thin membrane which is integral with said legs.

13. The torque transmission assembly defined in claim 4, wherein said circumferentially opening relief comprises a notch defined by a substantially smooth and continuous periphery in said elastomeric member and positioned radially outward from and adjacent the surface of said shoe to which said member is bonded.

14. The torque transmission assembly defined in claim 13, wherein the radially innermost periphery of said notch is adjacent to the surface of said shoe and forms a smooth, arcuate junction therewith.

15. The torque transmission assembly defined in claim 14, wherein said notch is semi-cylindrically shaped and has an axis lying parallel with the axis of said hub.

16. The torque transmission assembly defined in claim 13, wherein said notch extends substantially through the entire axial thickness of said elastomeric member except for a thin membrane formed integrally with said member and covering the axially facing radial surface of said member over said notch.

* * * * *